United States Patent Office 2,825,747
Patented Mar. 4, 1958

2,825,747

METHOD FOR FOAMING RUBBER

Arthur O. Rogers, Lewiston, and Marcus A. Stevens, Grand Island, N. Y., assignors to E. I. du Pont de Nemours & Company, Wilmington, Del., a corporation of Delaware No Drawing. Application October 1, 1954
Serial No. 459,856

1 Claim. (Cl. 260—724)

This invention relates to multi-cellular plastics and elastomers. More particularly, it relates to a method for preparing such materials by means of blowing agents.

One of the processes for modifying the bulk density of high polymers operates by the generation of gases within the polymer while it is being produced. The gases expand to form thousands of small pores or cells in the polymerized mass and thereby lower the density of the final product. Plastic foams and sponge rubbers are examples of products which may readily be formed in the manner described. This process for producing such expanded polymers is termed "blowing" and the chemicals which generate the gases are called "blowing agents."

To be suitable as blowing agents chemicals must have certain characteristics. They must first, of course, liberate a gas readily. Generally, liberation of the gas is accomplished by application of heat, or, in some instances, by contacting the agent with acids. Preferably, therefore, the agents should decompose at a fairly low temperature and over a relatively narrow temperature range. The gas evolved should, furthermore, be non-toxic and non-inflammable. It should also be non-reactive towards the high polymer undergoing treatment and should have little tendency to diffuse through or dissolve in the latter.

Blowing agents answering to the above criteria generally liberate either carbon dioxide or nitrogen. The use of carbon dioxide results in "open-cell" blowing where many evolved bubbles of carbon dioxide coalesce into one and form large and interconnecting pores in the finished product. Nitrogen, on the other hand, is used in "closed-cell" blowing. Bubbles of this gas tend to remain discrete, forming numerous separate pores in the polymerized plastic. Sodium bicarbonate is frequently used in open-cell blowing while unstable nitrogen compounds such as dinitrosopentamethylenetetramine are employed in closed-cell blowing.

The blown elastomer or plastic produced with carbon dioxide is generally not of very high quality. The open pores are quite permeable to water and other liquids and render the material unsuitable for many uses. In addition, the residues left by blowing agents producing carbon dioxide are usually strongly and undesirably alkaline. Products blown with nitrogen are, on the contrary, not permeable to water or oils and thus are particularly suited for use in materials which contact liquids such as shoe soles or gaskets. Residues left by nitrogen-generating agents heretofore employed tend, however, to discolor the products and to give them a bad odor.

A primary object of this invention, is therefore, provision of a novel agent and process for blowing high polymers such as plastics and elastomers. Another object is provision of a novel agent and process for the closed-cell blowing of high polymers. A further object is provision of a novel and useful process for the closed-cell blowing of polymers which does not discolor the product or give it a bad odor.

The above-mentioned and still further objects can be achieved in accordance with this invention by a process in which metal diazomethionates are utilized as blowing agents during the formation of plastic materials and the latter are set or hardened to solids retaining the resulting expanded structure.

The diazomethionates are known compounds which may be prepared by diazotizing the corresponding aminomethionates in the conventional manner. The aminomethionates may be formed in any of several ways, as for example, that of U. S. Patent 2,471,018. The diazomethionates are yellow crystalline solids decomposing in the dry state at about 130°–170° C. The structural formula of potassium diazomethionate may be written as:

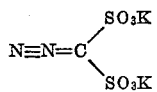

The sodium and potassium salts are the preferred blowing agents of this invention but other diazomethionates, such as those of the other alkali and alkaline earth metals, including ammonia, may be used as well.

Blowing may be accomplished by incorporating the diazomethionates in a monomer or lower polymer and subjecting the latter to polymerization conditions. In some instances, heat alone may be used both to polymerize the monomer or lower polymer and to liberate the nitrogen from the blowing agent. A temperature of around 130°–170° C. will readily free the nitrogen from the dry diazomethionates. Aqueous solutions of these compounds decompose at much lower temperatures, e. g., 40°–80° C. Consequently, these lower decomposition temperatures can be used in the presence of water if polymerization is simultaneously accomplished. The final product is a closed-cell sponge free from the odors of decomposition and from discoloration.

Besides the application of heat, several other methods may be employed to free the nitrogen. These methods include acidifying the polymerizing material and adding thereto a catalytic ion such as that of copper, silver or cobalt. In addition, certain compounds which may themselves be constituents of plastics react directly to free nitrogen from the diazomethionates. With such materials as formaldehyde, for example, no external aid is needed for the decomposition.

At high temperatures such as those desirable in vulcanizing rubber, dry diazomethionates may decompose with explosive violence. The diazomethionates should, therefore, always be contacted with an inert liquid when dry ingredients are to be polymerized. "Nujol" or other petroleum fractions are particularly satisfactory as inert liquids in this connection. Such hydrocarbons can, in fact, generally be employed to advantage with diazomethionate blowing agents. "Nujol" is the trade name for a heavy paraffin oil commonly used for medicinal purposes.

The quantity of diazomethionate employed will vary with the degree of porosity sought. In general, not more than 15 or 20% by weight of the elastomer or plastic being polymerized should consist of the blowing agent. Lower percentages, i. e., around 5%, are usually sufficient. However, higher percentages can be utilized if they are desired.

The pressure maintained during blowing operations with the diazomethionates is not particularly critical. In some cases the polymer may be exposed directly to the atmosphere while it is being cured and expanded. In others, the material may be placed in a mold and blown under high autogenous pressure.

It will be understood that the blowing agents and process of this invention are suitable for use with a wide variety of polymers. They may be utilized, for example, with elastomers such as artificial or natural rubber. They are also generally satisfactory for the blowing of artificial resins and plastics such as those formed from vinyl compounds, urea-formaldehyde, phenol-formaldehyde and the like.

In this specification the term "polymerization" will be utilized generically. It will refer to the formation of true linear polymers such as those of urea and formaldehyde or of cross-linked polymers such as polyvinyl formal. The term will also embrace the formation of elastomers as by the vulcanization of rubber. "Polymerization conditions" will include those conditions necessary to form any of the types of polymer mentioned above.

The invention will be understood in more detail from the examples which follow. In these examples all percentages are by weight and all runs are carried out at atmospheric pressure unless otherwise noted.

Example 1

This example shows the use of a diazomethionate during the vulcanization of rubber.

Four hundred grams of rubber, as smoked sheets, were milled with 35 g. of stearic acid, 20 g. of "Vaseline" petroleum jelly, 50 g. of zinc oxide, 12 g. of sulfur and 2 g. of an accelerator, tetramethylthiuram disulfide. One hundred fifty grams of the resulting mixture were milled further with 10 g. of dipotassium diazomethionate dampened with 30% of "Nujol" and then heated in an open mold at 130°–140° C. for 30 minutes. A firm rubber having a uniform cellular cross-section and possessing no malodor was produced. A sheet of rubber originally 1/16" thick was increased in thickness to about 3/16" by the process described.

Example 2

This example is another illustration of the use of a diazomethionate with rubber.

A cream-colored rubber stock was prepared by milling together 100 parts by weight of pale crepe rubber having a plasticity of 85, 5 parts of zinc oxide, 1 part of stearic acid, 11 parts of "Circo" process oil, 50 parts of whiting, 3.5 parts of sulfur and 1 part of benzothiazyl disulfide. "Circo" process oil is a light oil sold by the Sun Oil Company as a softener and aid in rubber compounding.

To 34 g. of this stock, containing 20 g. of rubber hydrocarbon, was added 1.88 g. of dipotassium diazomethionate and 1.12 g. of "Nujol." The resultant mixture was milled in a cold 2" x 6" laboratory rubber mill for about 10 minutes. The compounded stock thus obtained contained 9.4 parts of dipotassium diazomethionate for each 100 parts of rubber hydrocarbon.

A mold 3" in diameter and 1/4" deep was filled with the compounded stock. The cold mold was then placed under pressure between the platens of an electrically heated hydraulic press at 150° C. for 18 minutes. The resulting cured sponge showed an increase in volume of about 90%. The sponge exhibited uniform cell structure, possessed no malodor and showed no discoloration.

Example 3

This example shows the use of a diazomethionate in blowing a vinyl plastic while the latter is being formed by the cross-linkage condensation of "Elvanol" with formaldehyde. "Elvanol" is a trade name for polyvinyl alcohol sold by E. I. du Pont de Nemours & Company.

A 15% solution of "Elvanol" 72–60 (7.5 g.) in water was made weakly alkaline with 1% ammonia and heated to 80–90° C. To this solution were added, with vigorous stirring, 1.0 g. of dipotassium diazomethionate, 20 ml. of 40% aqueous formaldehyde and 10 ml. of 25% sulfuric acid in the order named. The foam that resulted was polymerized by heating to 60–80° C. for 30–45 minutes and was then washed free of acid and unreacted formaldehyde. The product was a soft white sponge with uniform cellular cross-section.

Example 4

This example shows the condensation and blowing of a urea-formaldehyde plastic.

Ten grams of dimethylol urea were ground to a fine powder, and mixed carefully with 0.5 g. of slightly dampened dipotassium diazomethionate. The resulting mixture was dampened with 6 ml. of water, allowed to stand for 10 minutes and then placed in an open cylindrical vessel with an internal diameter of two inches. The vessel was immersed in an oil bath at 160° C. for 10 minutes. Nitrogen was evolved rapidly and caused the urea-formaldehyde resin to rise into a brittle solid foam. During the foaming the volume of the plastic increased from 19 cubic centimeters to 49 cubic centimeters, the increase representing a liberation by the diazomethionate of approximately three quarters of the theoretical nitrogen.

Methylol urea or a mixture of urea and formaldehyde may, of course, be substituted for the dimethylol urea of this example.

Having described our invention, we claim:

The method of forming a blown elastomer which comprises compounding rubber stock and vulcanizing ingredients therefor with a diazomethionate in the presence of a liquid hydrocarbon and then vulcanizing the resultant mixture at a temperature not above about 170° C.

References Cited in the file of this patent
UNITED STATES PATENTS

| | | |
|---|---|---|
| 2,518,249 | Ott | Aug. 8, 1950 |
| 2,588,885 | Schlessinger | Mar. 11, 1952 |
| 2,658,876 | Reynolds | Nov. 10, 1953 |
| 2,660,194 | Hoffman | Nov. 24, 1953 |

FOREIGN PATENTS

| | | |
|---|---|---|
| 1,000,074 | France | Feb. 7, 1952 |